United States Patent
Miller

[15] 3,642,416
[45] Feb. 15, 1972

[54] MOLDING APPARATUS

[72] Inventor: Frederick O. Miller, Saginaw, Mich.

[73] Assignee: Miller Mold Company, Saginaw, Mich.

[22] Filed: July 26, 1968

[21] Appl. No.: 748,075

[52] U.S. Cl. ............................................. 425/438, 425/468
[51] Int. Cl. .................................................. B29c 17/00
[58] Field of Search ............... 18/DIG. 58, 35, 42 D, 42 M, 18/45 M, 2 RP; 249/175, 184, 185

[56] References Cited

UNITED STATES PATENTS

| | | | |
|---|---|---|---|
| 3,302,245 | 2/1967 | Scott | 18/35 |
| 3,343,801 | 9/1967 | Munger et al. | 18/42 X |

FOREIGN PATENTS OR APPLICATIONS

| | | | |
|---|---|---|---|
| 1,237,243 | 6/1960 | France | 18/DIG. 58 |
| 1,168,056 | 4/1964 | Germany | 18/DIG. 58 |
| 1,249,505 | 9/1967 | Germany | 18/DIG. 58 |

Primary Examiner—J. Howard Flint, Jr.
Attorney—Learman, Learman & McCulloch

[57] ABSTRACT

Apparatus for molding plastic articles comprising a mold having a cavity defined in part by an upstanding wall at one end of the cavity, the apparatus including a core member normally projecting from the end wall in a position to overhang the cavity. The core member is composed of a plurality of parallel slats pivoted to one another for relative movement and the slat adjacent the end wall is pivoted to the mold for rocking movement to enable the core member to be swung from its cavity-overlying position to a position substantially in prolongation of the end wall. Springs react between the end wall and the adjacent slat to urge the core member to its cavity-overlying position and springs react between each of the other slats to urge them into confronting, parallel relation.

12 Claims, 5 Drawing Figures

PATENTED FEB 15 1972

INVENTOR.
FREDERICK O. MILLER
BY: His Attorneys -
Learman, Learman y McCulloch

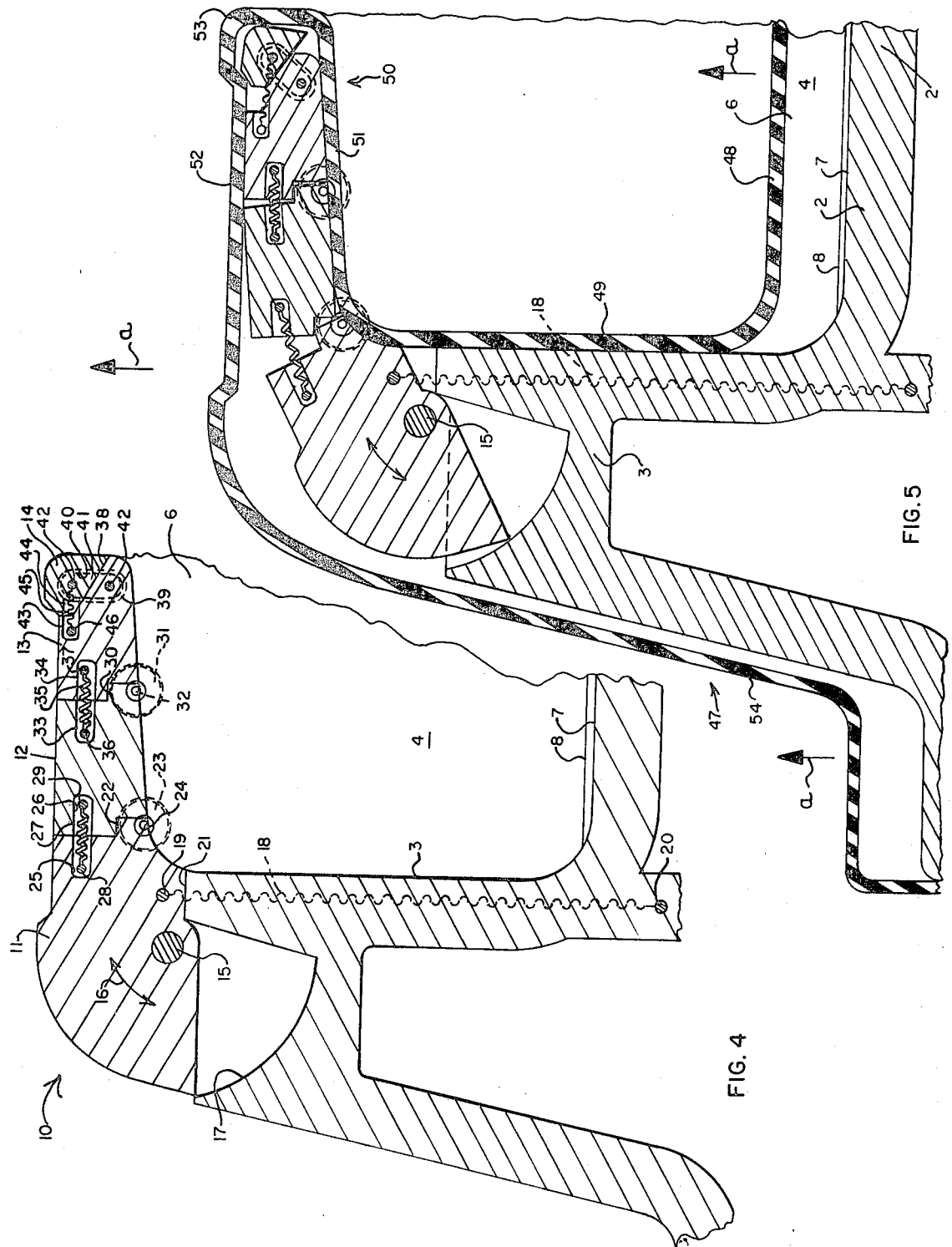

MOLDING APPARATUS

This invention relates to apparatus for molding plastic articles such as refrigerator door liners of the kind including a flat bottom shelf having an upstanding guard rail or lip to prevent articles from falling off the shelf during opening and closing of a refrigerator door. The apparatus, however, is capable of use in the molding of any other kind of article in which a lip or the like is to be provided.

In the molding of plastic articles of the kind referred to it is advantageous to form a lip or guard as an integral part of the article, thereby dispensing with the necessity of forming the guard as a separate operation and assembling the guard with the article. In those instances in which the guard or the like is hollow, however, the mold must be provided with a core which projects into the mold cavity and around which the plastic material must flow. After the plastic material has cured, the core must be extracted from the guard if the molded article is to be removed from the mold. Heretofore, molds capable of forming a hollow guard or lip of the character described have had to include a driving mechanism for moving the core between projected and retracted positions. Such mechanisms are expensive and require considerable maintenance to enable them to perform their function.

An object of this invention is to provide molding apparatus having a core which normally overhangs a cavity so as to enable the formation of a hollow guard or lip in a molded article, and in which movement of the molded article in a direction to remove it from the mold automatically withdraws the core from the lip.

Another object of the invention is to provide a mold having a core of the character referred to and in which the movements of the core are controlled automatically without reliance on driven means of any kind.

A further object of the invention is to provide an articulated core for a mold and in which the core is composed of a plurality of individual, slatlike elements which are capable of movement relative to each other and to the mold and which are biased constantly into parallel relationship with one another.

Other objects and advantages of the invention will be pointed out specifically or will become apparent from the following description when it is considered in conjunction with the appended claims and the accompanying drawings, in which:

FIG. 4 is an enlarged, sectional view taken on the line 4—4 of FIG. 2; and

FIG. 5 is a view similar to FIG. 4, but illustrating the molded plastic article in an initial position of movement in a direction out of the mold.

Figure 1:
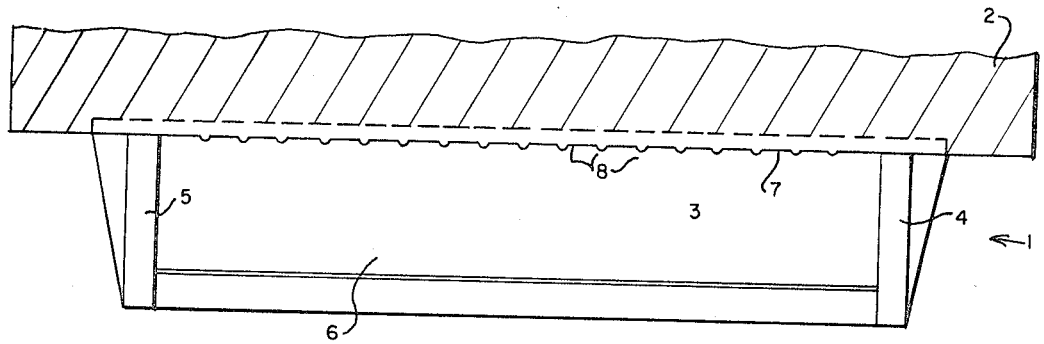
FIG. 1 is an inverted, transverse sectional view illustrating the mold cavity and the articulated core overhanging the cavity.

A mold constructed in accordance with the invention is designated generally by the reference character 1 and comprises a base 2 having an upstanding end wall 3 adjacent one end thereof, the opposite ends of the end wall being joined to side walls 4 and 5 so as to define a cavity 6 having a bottom surface 7. Preferably, the bottom surface is provided with upstanding ribs 8 so as to form corresponding ribs in the molded article. The sidewalls 4 and 5 adjacent the end wall 3 are provided with slots 9, the purpose of which will be explained hereinafter.

Mounted on the rear wall 3 of the mold and spanning the cavity 6 is a core member 10 composed of a plurality of elongated, rigid, slatlike bars 11, 12, 13 and 14. The slat 11 is pivoted at its opposite ends to the mold by means of pivot pins 15 so as to be capable of rocking back and forth in the directions of the two-headed arrow 16 shown in FIGS. 4 and 5. The upper edge of the wall 3 is provided with a longitudinally extending groove 17 to accommodate the rear end of the slat 11 when the latter is rocked counterclockwise from the projected position shown in FIG. 4 in which it overhangs the cavity 6. The slat 11 constantly is urged to the position shown in FIG. 4 by means of a spring 18 at each end of the slat, the ends of the springs being connected to pins 19 and 20 secured to the slat 11 and to the base 2, respectively. The upper edge of the wall 3 is provided with a flat surface 21 which lies in the path of movement of the slat 11 so as to limit clockwise rocking of the latter.

The forward edge of the slat 11 is provided with a stepped or shouldered surface 22 and the rear edge of the slat 12 is provided with a complementary surface. At the opposite ends of the slats 11 and 12 are overlying eyelets or ears 23 through each of which extends a pivot pin 24 by means of which the slats 11 and 12 are joined for relative rocking movement. At intervals along the length of the slats 11 and 12 the latter are provided with confronting slots 25 and 26, respectively, for the accommodation of tension springs 27, the opposite ends of each of which are anchored to pins 28 and 29 fixed in the respective slats. The arrangement is such that the springs 27 constantly bias the slats 11 and 12 to such positions as to seat their confronting edges on one another. In these positions of the slats 11 and 12 they are parallel and coplanar, and the arrangement of the eyelets 23 is such that the slats are capable of relative rocking movement in a direction to provide a space between their confronting surfaces, but cannot rock in the opposite direction.

The forward edge of the slat 12 is provided with a stepped or shouldered surface 30 similar to the surface 22, and the rear edge of the slat 13 is provided with a complementary surface. At opposite ends of the slats 12 and 13 are overlying eyelets 31 which are connected by pivot pins 32. The slats 12 and 13, therefore, are capable of relative rocking movement in the same manner as the slats 11 and 12. The slats 12 and 13 also are provided with spaced slots 33 and 34, respectively, in each of which is a tension spring 35 having its opposite ends anchored to pins 36 and 37. The springs 35 normally maintain the confronting surfaces of the slats 12 and 13 in abutting relation.

The forward end of the slat 13 is provided with a downwardly and forwardly inclined surface 38 and the slat 14 has a complementary surface which seats upon the surface 38. At intervals along the slats 13 and 14 are slots 39 and 40, respectively, in which are mounted links 41 by means of pivot pins 42. The slats 13 and 14 also are provided with aligned slots 43 and 44, respectively, in which are tension springs 45, the opposite ends of which are anchored to the pivot pins 42 and to pins 46 in the slots 43. The arrangement is such that the slat 14 is capable of rocking clockwise from the position shown in FIG. 4 and sliding upon the surface 38 of the slat 13, but the spring 45 normally acts on the slat 14 and biases it to a position in which the latter is seated on the surface 38 of the slat 13.

Figure 2:
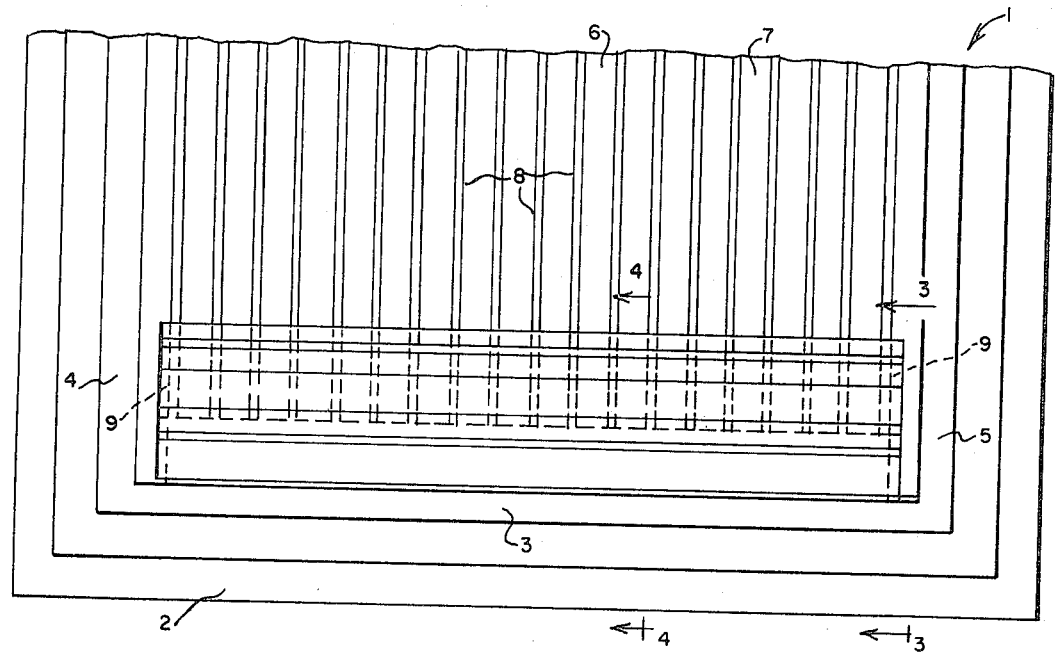
FIG. 2 is a top plan view of the apparatus shown in FIG. 1.

As is indicated in FIG. 2, the opposite ends of the slats 11–14 extend beyond the inner surfaces of the sidewalls 4 and 5. The eyelets between the links 11 and 12 and between the links 12 and 13 are so arranged as to be accommodated in the slots 9, thereby enabling the upper edges of the walls 3, 4 and 5 to form a smooth juncture with the core when the latter is in its projected position. The overlying ends of the slats also preclude any possibility that the slats could project into the mold cavity.

Figure 3:
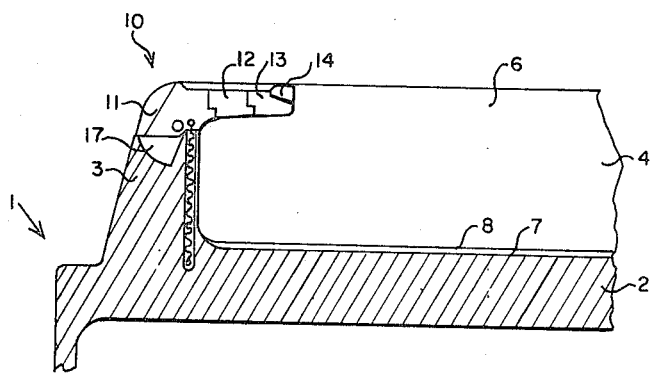
FIG. 3 is a sectional view taken on the line 3—3 of FIG. 2.

When the mold apparatus is conditioned for operation the core member 10 will occupy a position in which it projects forwardly of the end wall 3 so as to overhang the cavity 6 as is shown in FIGS. 3 and 4. An upper mold member (not shown) will be brought into overlying relation with the mold 1, as is customary. A suitable plastic material then may be introduced to the mold to form a plastic article 47, a portion of which is shown in FIG. 5. The disclosed article 47 constitutes a part of a refrigerator door liner including a rear wall 48 having a shape corresponding to the bottom 7 of the cavity 6 and a shelf or ledge 49 corresponding to the shape of the inner surface of the upstanding wall 3. The end of the shelf 49 remote from the rear wall 48 is provided with a hollow lip or rail 50 having an inner wall 51, an outer wall 52, and an end wall 53 which joins the walls 51 and 52. The wall 52 merges with an inclined, outer wall 54. The ability of the slat 14 to slide, as well as to rock, relatively to the slat 13 enables the end wall 53 to be provided with an enlargement as is shown in FIG. 5.

The lip 50 assumes the shape of the core member 10 when the latter is in its cavity-overhanging position and the core member must be removed from the lip in order to remove the article 47 from the mold.

To remove the article 47 from the mold a force is applied to the article 47, either manually or mechanically, in the direction of the arrows *a* in FIG. 5 so as to effect relative movement between the mold 1 and the article 47. As the article 47 moves relatively to the mold, the inner wall 51 of the lip 50 will exert a force on the core member tending to rock it about the axis of the pivots 15, thereby causing the slats 11–14 to be moved to the left, as viewed in FIG. 5. As the slats move to the left and as the relative movement of the members 1 and 47 continues, the slats 11–14 will rock relatively to one another, as is permitted by their pivotal connections, thus allowing the individual slats to shift their relative positions and move in an arcuate path without damaging the lip 50. As the article 47 continues to move relatively to the mold, the individual slats of the core will continue to be rocked about their respective pivots and about the axis of the pivots 15 until such time as the slats are withdrawn completely from the lip 50. At this time the core 10 will be in such position as to extend substantially in prolongation of the end wall 3 and the article 47 may be removed completely from the mold.

Following removal of the article 47 from the mold, the springs 18 rock the slats 11 clockwise and the springs 27, 35 and 45 restore the slats 11–14 to their edge-abutting relation, thereby repositioning the core 10 in overhanging relationship to the cavity 6.

The disclosed embodiment is representative of a presently preferred form of the invention but is intended to be illustrative rather than definitive thereof. The invention is defined in the claims.

I claim:

1. Molding apparatus comprising a mold having a cavity therein terminating at one end in an upstanding, fixed wall; a core member; means pivotally mounting one end of said core member on said mold for rocking movement about a fixed axis at the upper end of said wall from a first position in which said core member overhangs said cavity to a second position in which said core member extends substantially in prolongation of said wall, said core member comprising a plurality of elongated slats arranged one adjacent another; and pivotal means connecting said slats to one another for rocking movement of said slats relative to one another and relative to said mold.

2. Apparatus as set forth in claim 1 including spring means acting on said core member and yieldably biasing the latter to said first position.

3. Apparatus as set forth in claim 1 including spring means connecting said slats one to another and biasing the latter to side-by-side confronting relation.

4. Apparatus as set forth in claim 1 wherein said pivotal means are so located on said adjacent slats as to permit relative pivotal movement thereof in one direction only from a normal position in which confronting surfaces of adjacent slats abut one another.

5. Apparatus as set forth in claim 1 including means acting between said mold and said core member for limiting rocking movement of the latter relative to said mold.

6. Apparatus as set forth in claim 1 wherein the slat at that end of the core opposite said one end thereof has an inclined surface confronting a complementally inclined surface on the adjacent slat to enable the slat at the opposite end of said core member to slide relatively to its adjacent slat.

7. Apparatus as set forth in claim 6 wherein the pivotal means connecting the slat at said opposite end of said core member to its adjacent slat comprises links.

8. Molding apparatus comprising a mold having a cavity therein terminating at one end in an upstanding, fixed wall; an articulated core having a plurality of individual, elongated slat members arranged in side-by-side relation; means pivotally connecting said slat members one to another for rocking movement relative to one another; and means pivotally mounting the slat member at one end of said core on said mold for rocking movement about a fixed axis at the upper end of said wall from a first position overhanging said cavity to a second position substantially in prolongation of said wall, the pivotal connections of said slat members to one another being such that rocking movement of the slat at said one end of said core in a direction toward said second position enables the remaining slats to move conjointly linearly toward said wall and in an arcuate path about said axis.

9. Apparatus as set forth in claim 8 wherein said slats are pivoted to one another in such manner that adjacent slats occupy a normal position relative to one another in which the confronting edges of adjacent slats abut one another and the adjacent slats are rockable relatively to one another in one direction only from said normal position.

10. Apparatus as set forth in claim 9 including spring means connecting adjacent slats to one another and biasing said slats to said normal position.

11. Apparatus as set forth in claim 8 including spring means acting on the slat at said one end of said core and biasing such slat to said first position.

12. Apparatus as set forth in claim 8 including means acting between said mold and said core for limiting movement of the latter relative to said mold.

* * * * *